United States Patent
Jhang et al.

(10) Patent No.: US 7,944,954 B2
(45) Date of Patent: May 17, 2011

(54) LASER APPARATUS WITH ALL OPTICAL-FIBER

(75) Inventors: Yao-Wun Jhang, Chiayi (TW); Chien-Ming Huang, Taipei (TW); Hsin-Chia Su, Yunlin County (TW); Shih-Ting Lin, Tainan (TW); Li-Ting Wang, Pingtung County (TW); Hong-Xi Cao, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/400,788

(22) Filed: Mar. 9, 2009

(65) Prior Publication Data
US 2010/0166027 A1    Jul. 1, 2010

(30) Foreign Application Priority Data
Dec. 31, 2008   (TW) .............................. 97151893 A

(51) Int. Cl.
*H01S 3/30* (2006.01)
(52) U.S. Cl. .................. 372/6; 372/68; 372/69; 372/70; 372/71; 359/333; 359/341.1; 359/341.3; 359/342
(58) Field of Classification Search ................ 372/6, 68, 372/69, 70, 71; 359/333, 341.1, 341.3, 342
See application file for complete search history.

(56) References Cited

U.S. PATENT DOCUMENTS

| | | | |
|---|---|---|---|
| 5,541,012 A * | 7/1996 | Ohwaki et al. ................ | 428/690 |
| 5,638,394 A | 6/1997 | Kim et al. | |
| 5,677,920 A * | 10/1997 | Waarts et al. ..................... | 372/6 |
| 5,727,007 A * | 3/1998 | Smart et al. ....................... | 372/6 |
| 5,805,631 A * | 9/1998 | Xie et al. .......................... | 372/68 |
| 5,930,030 A * | 7/1999 | Scifres ......................... | 359/341.3 |
| 6,081,369 A * | 6/2000 | Waarts et al. ............. | 359/341.33 |
| 6,278,719 B1 * | 8/2001 | Ohishi et al. ..................... | 372/6 |
| 6,360,040 B1 * | 3/2002 | Srinivasan et al. .............. | 385/33 |
| 7,245,424 B2 * | 7/2007 | Dennis et al. ............. | 359/341.41 |
| 7,280,567 B2 * | 10/2007 | Luo et al. .......................... | 372/6 |
| 2007/0133625 A1 * | 6/2007 | Ahn et al. ......................... | 372/6 |
| 2008/0180787 A1 * | 7/2008 | DiGiovanni et al. ......... | 359/334 |
| 2009/0067453 A1 * | 3/2009 | Mizuuchi et al. ................. | 372/6 |

* cited by examiner

*Primary Examiner* — Minsun Harvey
*Assistant Examiner* — Yuanda Zhang
(74) *Attorney, Agent, or Firm* — Jianq Chyun IP Office

(57) ABSTRACT

A laser apparatus with all optical-fiber includes a plurality of pumping light sources in different wave bands and an optical-fiber laser system. The optical-fiber laser system includes an optical fiber at least doped with erbium (Er) element and doped with or not doped with ytterbium (Yb) element according to a need. The optical-fiber laser system outputs a laser light through the pumping light source.

2 Claims, 9 Drawing Sheets

US 7,944,954 B2

LASER APPARATUS WITH ALL OPTICAL-FIBER

CROSS-REFERENCE TO RELATED APPLICATION

This application claims the priority benefit of Taiwan application serial no. 97151893, filed Dec. 31, 2008. The entirety of the above-mentioned patent application is hereby incorporated by reference herein and made a part of specification.

BACKGROUND OF THE INVENTION

1. Field of the Invention

The present invention generally relates to a laser technique, in particular, to a laser apparatus with all optical-fiber, which is capable of emitting a green laser light with a high efficiency.

2. Description of Related Art

In recent years, as the laser projection concept has become prevailing, the demand on green laser light sources with small scale and high power is gradually increased, but green laser diodes are still immature. As for diode pumped solid state (DPSS) laser, the frequency-doubling green laser has problems about assembly difficulty and heat dissipation, and what's worse, the heat dissipation further affects the laser stability. As a result, it cannot achieve both the small scale feature and the desirable heat dissipation mechanism. However, a green gas laser has problems of low efficiency, large volume, and high price.

Currently, the realized wave bands of an optical-fiber laser are mostly close to infrared and middle infrared wave bands, and are widely applied to mechanical processing, biomedical, and communicating purposes. However, the optical-fiber laser in visible-light wave bands is still in the stage of being researched in the laboratory, and the total power thereof still cannot be distinctly improved.

In the prior art, in U.S. Pat. No. 5,638,394, a laser diode with a wavelength of 980 nm serving as a pumping light source emits lights to an optical fiber doped with both ytterbium (Yb) and terbium (Tb), and a blue reflecting mirror and a green reflecting mirror are placed on two ends of the optical fiber, so as to form a laser resonance cavity. The generated light is not in an all optical-fiber structure, so the stability thereof is rather poor. In addition, the optical-fiber laser doped with Tb also has a poor efficiency. In another U.S. Pat. No. 5,805,631, a laser diode with a wavelength from 790 nm to 900 nm serving as a pumping light source emits lights to an optical fiber doped with both praseodymium (Pr) and Yb, and a laser resonance cavity is formed on two ends of the optical fiber in a manner of reflecting mirrors or gratings. A single pumping light source is used, such that the Pr ion excited state absorption (ESA) effect cannot be sufficiently utilized.

As for the green lasers, the researching direction thereof is a laser system with a small size, high power, and high stability.

SUMMARY OF THE INVENTION

Accordingly, the present invention is directed to a laser apparatus with all optical-fiber.

As embodied and broadly described herein, the present invention provides a laser apparatus with all optical-fiber, which includes a plurality of pumping light sources in different wave bands and an optical-fiber laser system. The optical-fiber laser system includes an optical fiber at least doped with erbium (Er) element. The optical-fiber laser system outputs a laser light through the pumping light source. Furthermore, the optical fiber is doped with or not doped with ytterbium (Yb) element according to a need.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
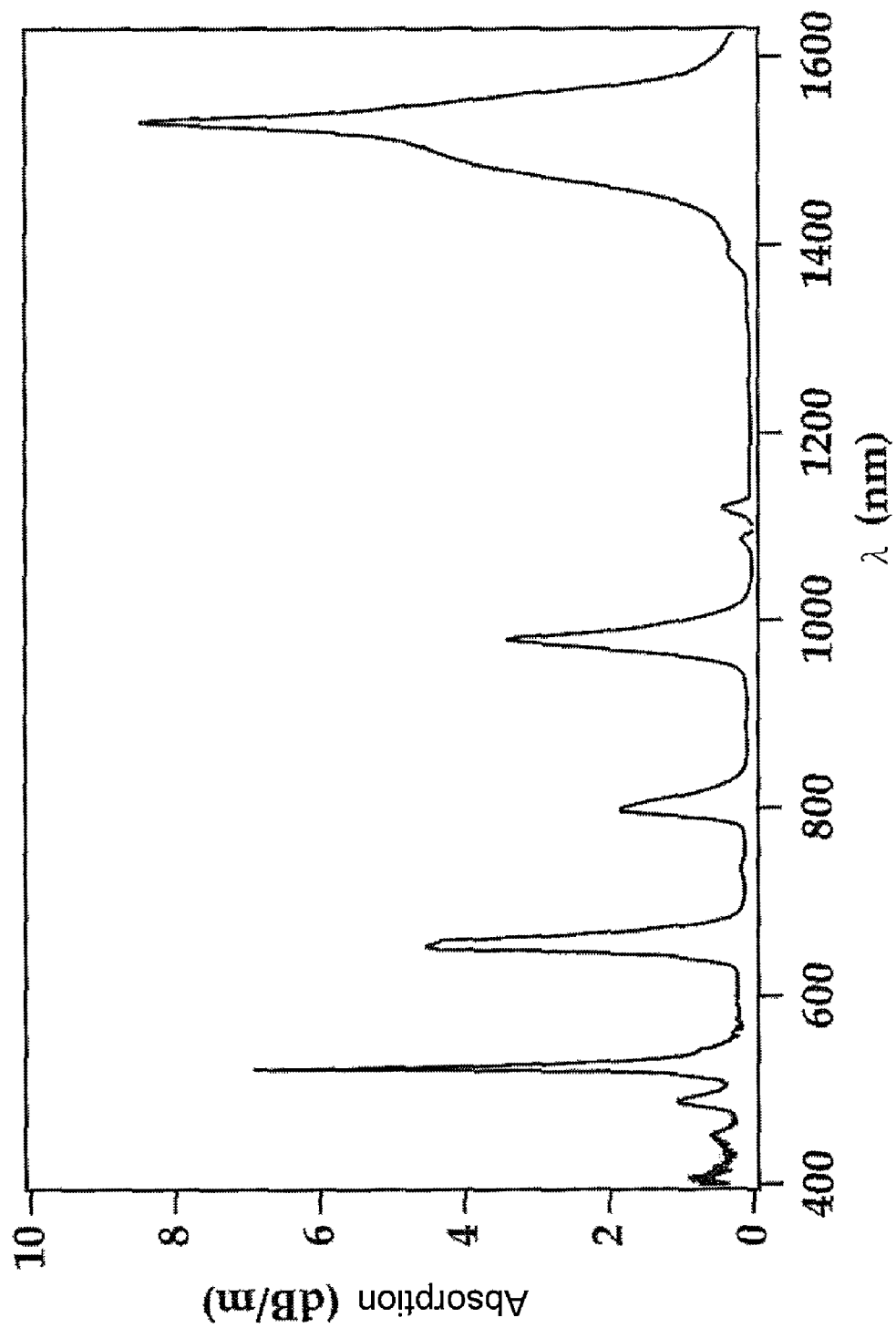
FIG. 1 shows an absorption spectrum of an Er ion according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

According to the present invention, in a green light laser system with a small scale and high power, an optical fiber is doped with both Er and Yb, so as to improve an absorption efficiency of a pumping light source and to reduce a quenching effect of Er ions with a high concentration. In addition, for example, when the pumping light sources with more than two light sources are applied, for example, an excited state absorption (ESA) effect of the Er ions is enhanced, so as to increase an accumulation quantity of the Er ions in the green light $^2H_{11/2}$ energy level effect. Accordingly, the laser system is further combined with a linear resonance cavity, an annular resonance cavity, or an amplifier system, so as to form an all-optical-fiber green light laser with a high power.

The optical fiber doped with Er ions has a green light laser energy level with a wavelength from 0.54 μm to 0.55 μm. In the present invention, the pumping light source with a wavelength of 975 nm, for example, is utilized to excite the Er ions to accumulate in a meta-stable state $^4I_{13/2}$. In addition, the optical fiber is, for example, an optical fiber doped with both Er and Yb ions, so that the Yb ions are enabled to absorb the pumping light source of approximately 975 nm and to be converted to Er ions, so as to reduce the pump energy wasted by the Er ions due to the quenching effect. In addition, the Er ions have an intense ESA effect on the light source of approximately 800 nm, so that the light source of 800 nm is used to excite the Er ions at the meta-stable state $4I_{13/2}$ to the $2H_{11/2}$ energy level. In other words, by utilizing the technique of doping both Er and Yb and the double pumping light sources, the entire green light laser efficiency of the optical fiber doped with Er is improved.

In the above mechanism, the optical fiber doped with both Er and Yb serves as the basis. However, if the optical fiber is merely doped with Er, the green light effect can also be generated. Based on the above mechanism of utilizing various light sources with the low energy to excite for several times to reach the green light energy level, the adopted light sources are not limited to double pumping light sources. Considering the energy level of the Er ions, a light source of approximately 1480 nm, for example, may be further utilized for compensation, so as to improve the efficiency.

The present invention is described as follows with several embodiments, but the present invention is not limited to the embodiments. The following embodiments can be appropriately combined to one another.

The technical solution is achieved by the following method and materials, for example, a pumping technique with a plurality of light sources and a pulse modulation technique for pumping light sources are adopted, and a fluoride optical fiber doped with both Er and Yb is taken as an example, in which Yb element is used for auxiliary effects, so it is not absolutely necessary. The theory background of the exciting mechanism is described as follows.

The pumping technique with a plurality of light sources is adopted considering a valence electron configuration of $^4f_{11}$ of the Er ion $Er^{3+}$, which has a $^4I_{15/2}$ ground state and includes $^4I_{13/2}$, $^4I_{11/2}$, $^4I_{9/2}$, $^4F_{9/2}$, $^4S_{3/2}$, $^2H_{11/2}$, $^4F_{7/2}$, $^2H_{9/2}$, and other low level excited states. FIG. 1 shows an absorption spectrum of an Er ion according to an embodiment of the present invention, and FIG. 2 shows a valence electron configuration of an Er ion according to an embodiment of the present invention.

Figure 2:
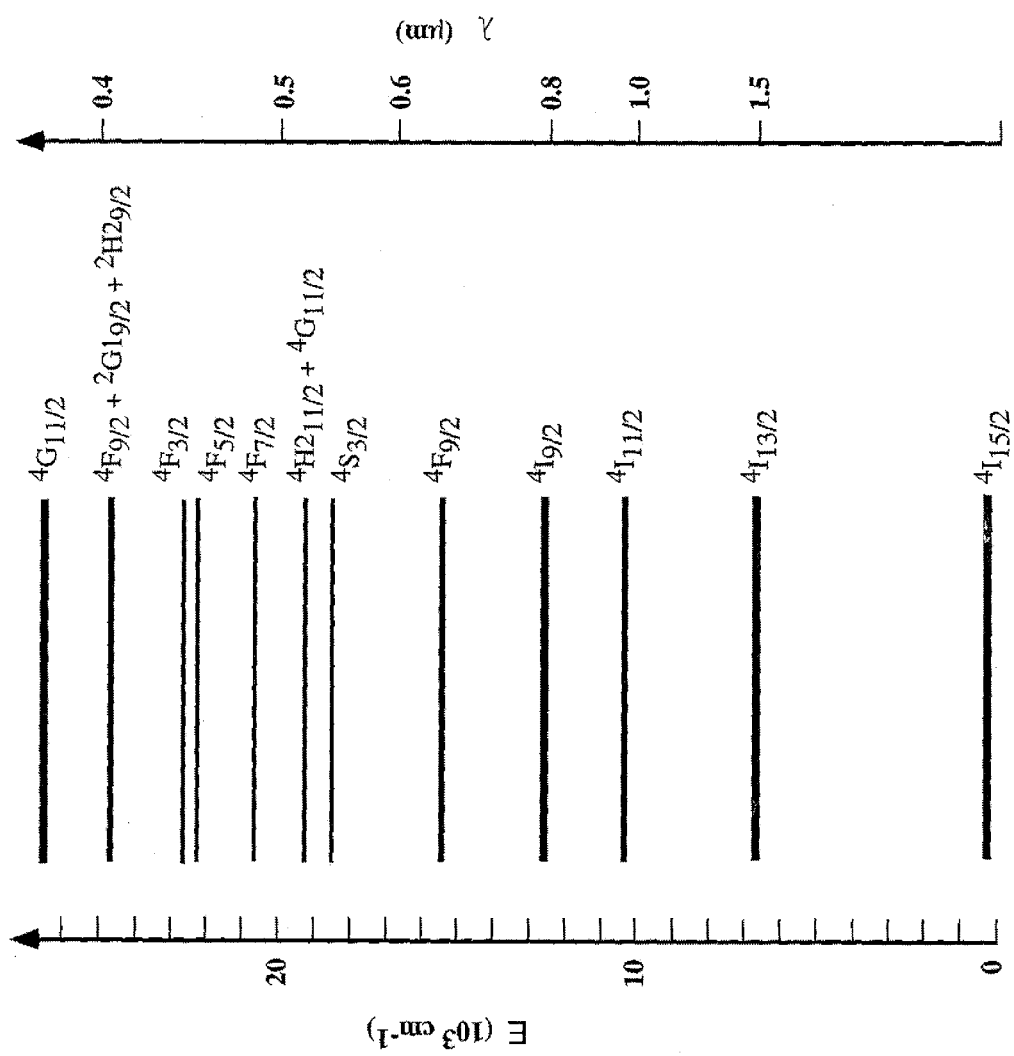
FIG. 2 shows a valence electron configuration of an Er ion according to an embodiment of the present invention.

Referring to FIG. 2, the Er ion has been widely applied to the laser of 1550 nm, and furthermore, the Er ion $Er^{3+}$ further has a green light laser transition mechanism, for example, $^4S_{3/2} \rightarrow ^4I_{15/2}$. In a silicon-based optical fiber, the laser wavelength is in a range from 540 nm to 550 nm. Various different pumping light sources may be adopted to excite the ground state Er ion to $^4S_{3/2}$. Referring to FIG. 1, although the Er ion has several absorption wave bands, only the diode lasers using the pumping light source in the infrared wave band, for example, 800 nm, 970 nm, and 1480 nm can achieve economic benefits. However, the pumping light source cannot directly excite the Er ion to the $^4S_{3/2}$ energy level to generate the required green light of approximately 540 nm.

Figure 3:
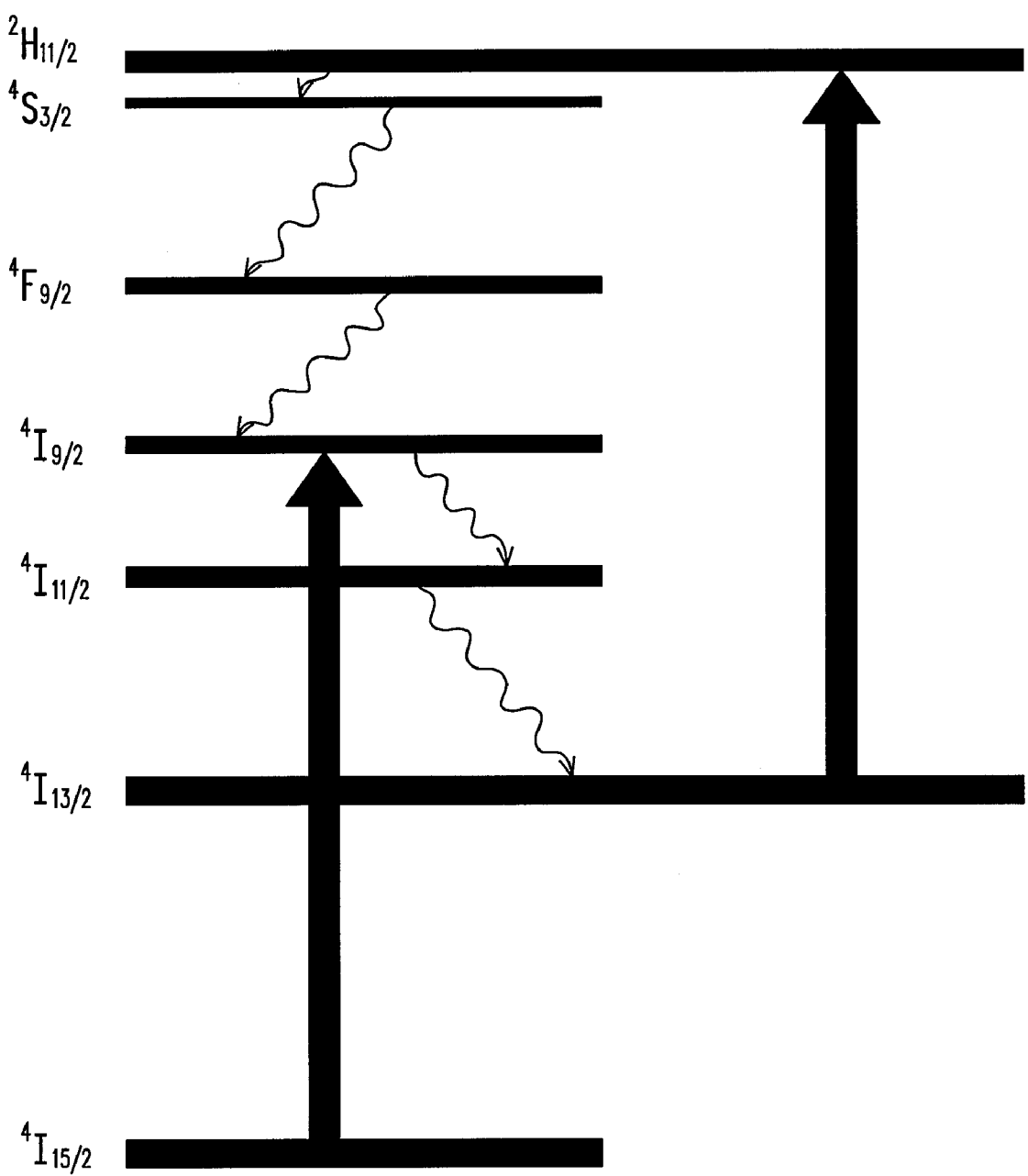
FIG. 3 is a schematic view of an excitation performed on an Er ion by a pumping light source of 800 nm according to an embodiment of the present invention.
Figure 4:
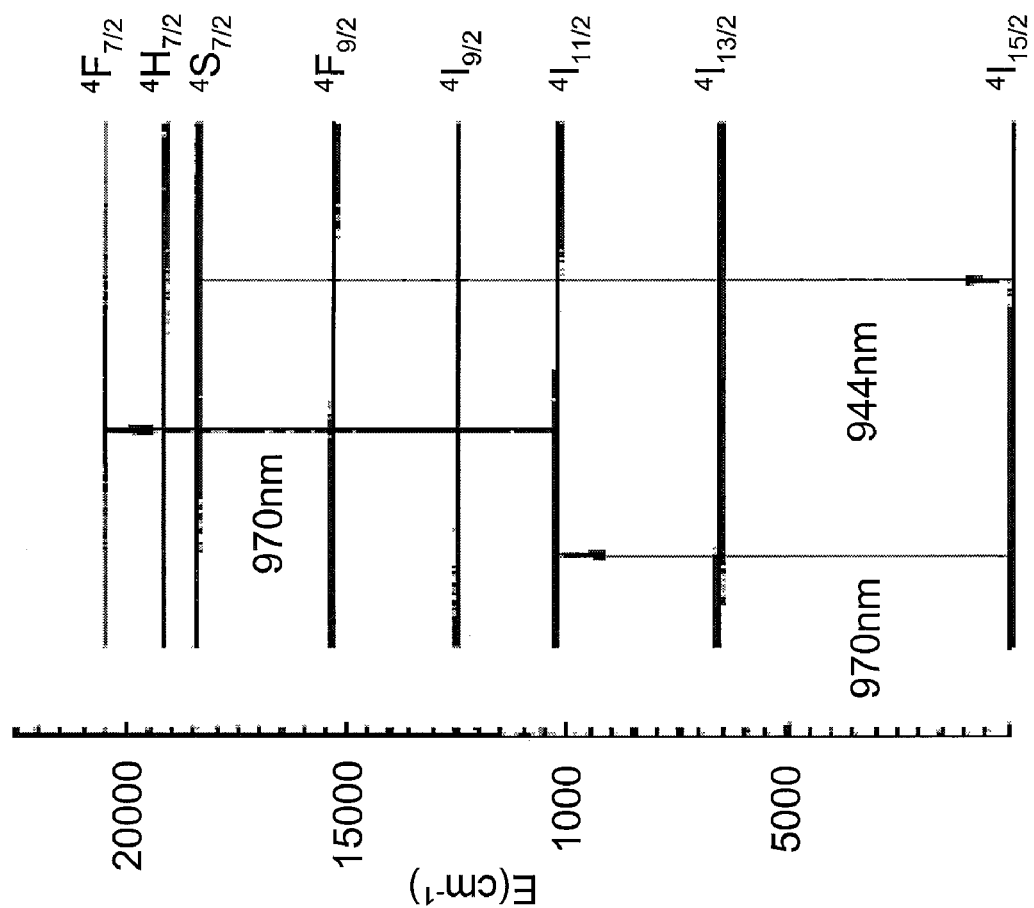
FIG. 4 is a schematic view of an excitation performed on an Er ion by a pumping light source of 970 nm according to an embodiment of the present invention.
Figure 5:
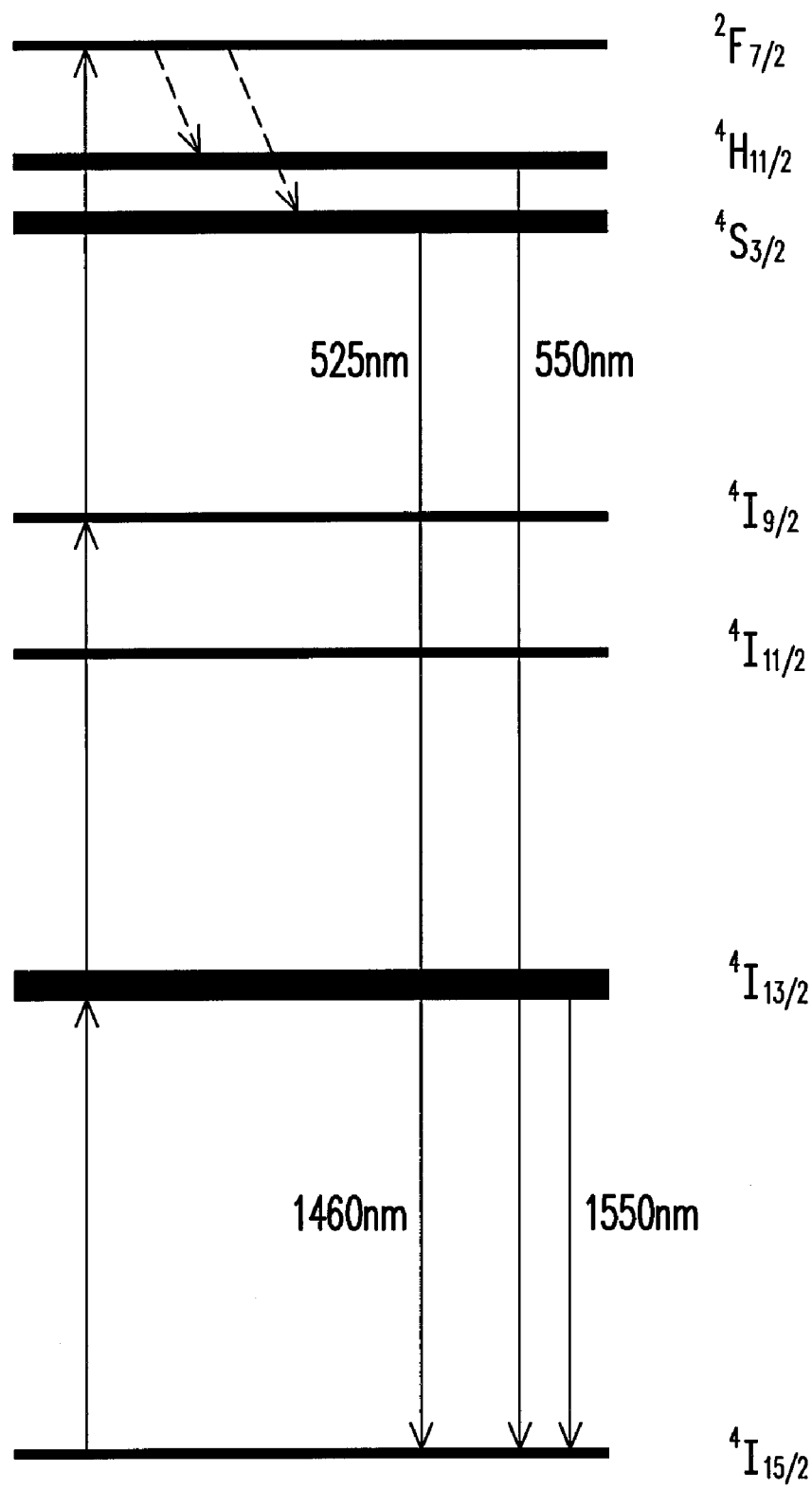
FIG. 5 is a schematic view of an excitation performed on an Er ion by a pumping light source of 1480 nm according to an embodiment of the present invention.

FIG. 3 is a schematic view of an excitation performed on an Er ion by a pumping light source of 800 nm according to an embodiment of the present invention. Referring to FIG. 3, if only the pumping light source of 800 nm is used, the Er ion must repeatedly absorb two photons, so as to reach the energy level for emitting the green light. FIG. 4 is a schematic view of an excitation performed on an Er ion by a pumping light source of 970 nm according to an embodiment of the present invention. Referring to FIG. 4, if only the pumping light source of 970 nm is used, the Er ion also must repeatedly absorb two photons, and then emits the green light from the $^4S_{3/2}$ energy level. FIG. 5 is a schematic view of an excitation performed on an Er ion by a pumping light source of 1480 nm according to an embodiment of the present invention. Referring to FIG. 5, if only the light source of 1480 nm is used, the Er ion must repeatedly absorb three photons.

However, if the light sources of the above three wave bands are separately used, they are still physically limited, thereby affecting the conversion efficiency. As seen from the manner of FIG. 4, in an energy level up-conversion mechanism of the Er ion using the light source of 970 nm, the Er ion in the $^4I_{15/2}$ ground state absorbs the photon of 970 nm and is transited to the $^4I_{11/2}$ excited state, then absorbs the photon of 970 nm and is transited to the $^4F_{7/2}$ excited state, which must be accumulated to the population of the Er ion in the $^4I_{11/2}$ excited state. However, the $^4I_{11/2}$ excited state may be relaxed and transited to a $^4I_{13/2}$ meta-stable state in a non radiation manner, in which the life cycle of $^4I_{13/2}$ is longer than that of $^4I_{11/2}$, such that the population of the Er ion is accumulated at the $^4I_{13/2}$ meta-stable state instead of the $^4I_{11/2}$ excited state. As a result, the efficiency of the energy level up-conversion mechanism of the Er ion using the light source of 970 nm to $^4S_{3/2}$ is restricted.

Figure 6:
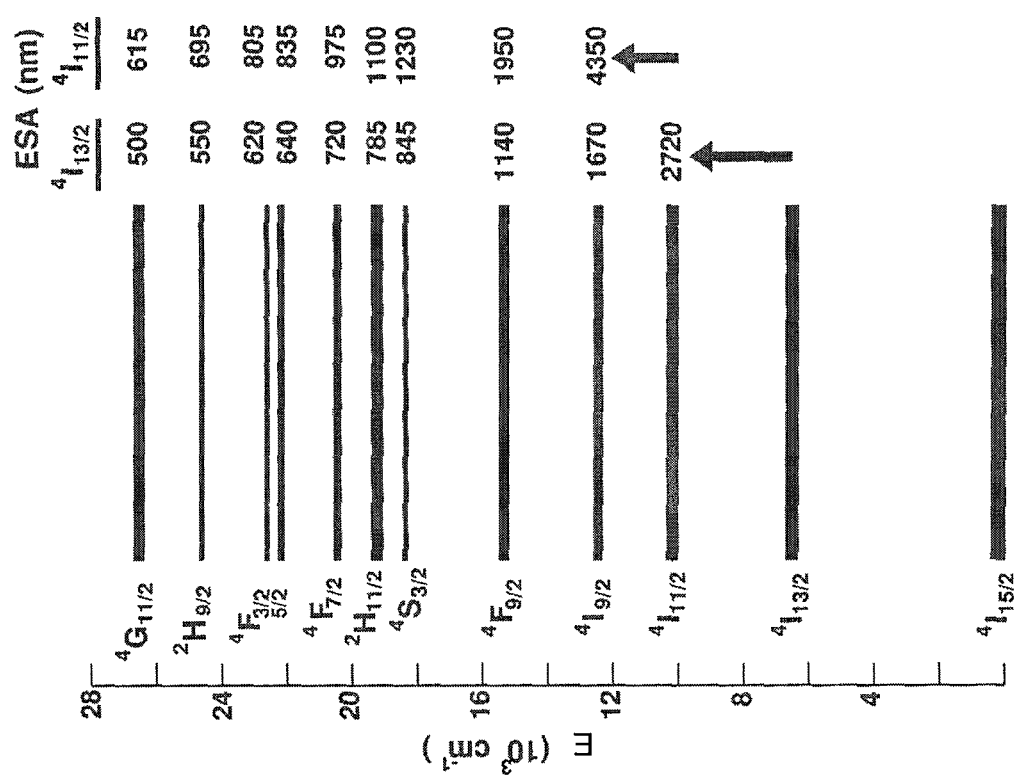
FIG. 6 shows an ESA rate of an Er ion according to an embodiment of the present invention.

Furthermore, as for the mechanism of using the light source of 800 nm, as shown in FIG. 3, the Er ion in the $^4I_{15/2}$ ground state absorbs the photon of 800 nm and is transited to the $^4I_{9/2}$ excited state, then is relaxed and transited to the $^4I_{13/2}$ meta-stable state, and then further absorbs the photon of 800 nm and is transited to $^2H_{11/2}$. Referring to FIG. 6, it shows an ESA rate of an Er ion according to an embodiment of the present invention. As known from FIG. 3, the Er ion in the $^4I_{13/2}$ state needs to absorb a photon with a wavelength of 800 nm. However, as shown in the data of FIG. 6, the GSA of the Er ion on the photon of 800 nm is rather poor. In this manner, the efficiency of generating the green light only by using the photon of 800 nm is not desirable.

Furthermore, the absorption spectrum of the Er ion shown in FIG. 1 is inspected again, in which an absorption section of the Er ion at 1480 nm is much larger than that of 800 nm and 970 nm. However, in order to use the 1480 nm, twice energy level up-conversion processes are required to transit to $^4F_{7/2}$, such that the total efficiency is not high.

Therefore, the practical solution is, for example, using three types of pumping light sources at the same time, so as to increase the probability of the up-conversion to $^4S_{3/2}$. Considering the main up-conversion path thereof, the light sources of 970 nm and 1480 nm are used to accumulate the population in the $^4I_{13/2}$ meta-stable state, then the Er ion absorbs the photon of 800 nm and is transited to the $^4I_{9/2}$ excited state, and then is relaxed and transited to the $^4S_{3/2}$, so as to form a green light laser mechanism. The absorption section of the light source of 1480 nm is fairly large, and the quantum conversion efficiency is quite high. In other words, the Er ion is excited by using the light source of 970 nm, so as to improve the population in the $^4I_{13/2}$ meta-stable state. Then, the 800 nm photon is absorbed, so that the Er ion is transited from the $^4I_{13/2}$ meta-stable state to the $^2H_{11/2}$, and is then relaxed and transited to the $^4S_{3/2}$, so as to emit the green light.

Figure 7:
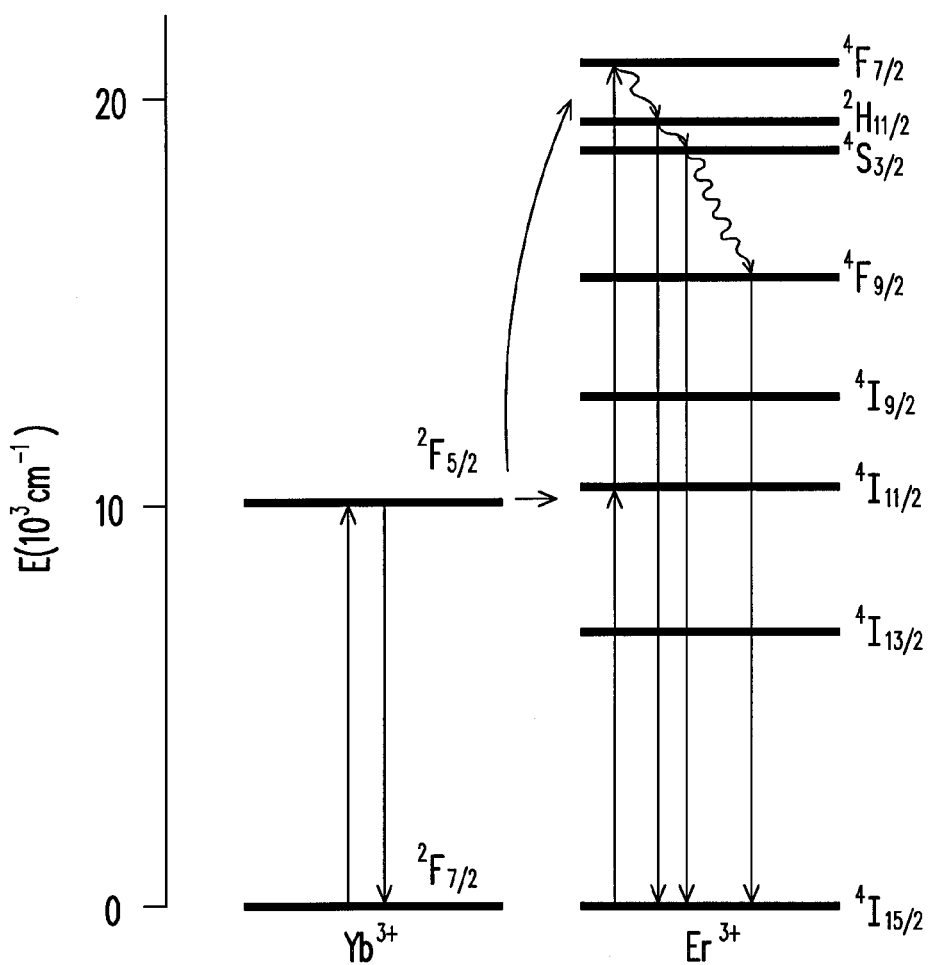
FIG. 7 is a schematic view of an energy conversion between Er ions and Yb ions according to an embodiment of the present invention.

The above mechanism is directed to the optical fiber merely doped with Er ions. However, since the adopted light sources include the light source of 970 nm, the optical fiber may also be doped with Yb ions. The function of using the light source of 970 nm further includes impelling the Yb ions in the optical fiber doped with both Er and Yb ions to be converted into the Er ions through the strong absorption effect of the Yb ions on the photons of 970 nm, thereby improving the efficiency. FIG. 7 is a schematic view of an energy conversion between Er ions and Yb ions according to an embodiment of the present invention. Referring to FIG. 7, when the Yb ion also absorbs the light source of 970 nm, the Yb ion has a high GSA on the light source of 970 nm, so that the Yb ion is transited from the $^2F_{7/2}$ ground state to the $^2F_{5/2}$ excited state. When the Yb ion is transited back to the $^2F_{7/2}$ ground state from the $^2F_{5/2}$ excited state, the emitted photon is absorbed by the neighboring Er ion, thereby improving the efficiency for absorbing the light source of 970 nm by the Er ion.

Figure 8:
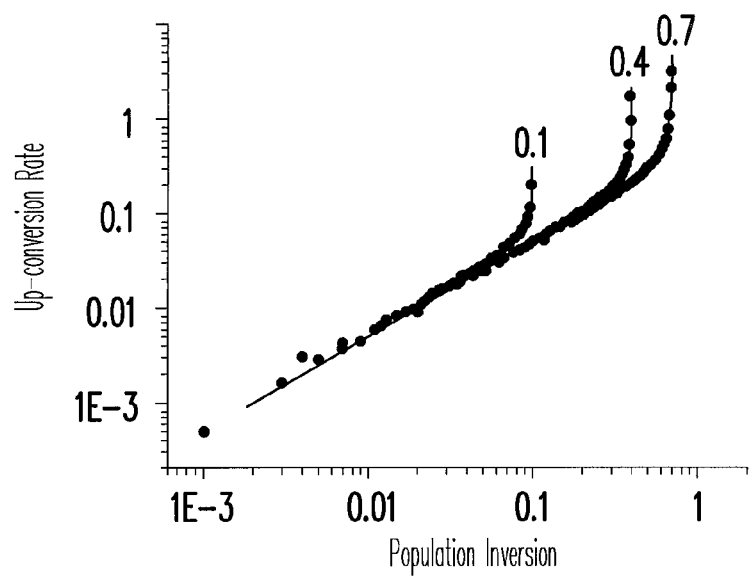
FIG. 8 is a schematic view of a frequency up-conversion efficiency simulation by using a Monte Carlo algorithm according to an embodiment of the present invention.

Then, the function of a pulse pump is described. FIG. 8 is a schematic view of a frequency up-conversion efficiency simulation by using a Monte Carlo algorithm according to an embodiment of the present invention. Referring to FIG. 8, three fitting curves are obtained by simulating the relation between the photo population inversion and the up-conversion efficiency (also called frequency up-conversion efficiency) in different unit times. It is shown from the data that, the high population inversion improves the laser up-conversion efficiency. Therefore, a short pulse time width may be used, and a full width at half maximum (FWHM) is at the nano second level. Through a high power laser, the Er ion is transiently excited to the energy level in the pulse time, thereby improving the up-conversion efficiency.

As for a fluoride optical fiber, the life cycle of the electron on the energy level is relevant to the material of the optical fiber. When the Er ion is respectively doped in optical fibers of ZBLAN and silica, the life cycle of the high excited state $^4F_{7/2}$ in the optical fiber of ZBLAN is 0.45 ms, and the life cycle of the energy level in the optical fiber of silica is only 0.001 ms or 1 μs, which can be explained by a multi-phonon emission. As for a certain energy level, the speed W of the multi-phonon emission can be represented as a function of an energy difference ΔE between the current energy level and the next energy level, that is, $$W = C\exp\left(-\frac{\Delta E}{ah\omega}\right). \quad (1)$$

In the above equation, C and a are constants, and hω is a phonon energy of the material, which is approximately 1000 cm$^{-1}$ or 124 meV in the material of silica and Borate glass. In ZBLAN, the value hω is smaller than 600 cm$^{-1}$ or 74.4 meV, and is approximately a half of the former value. The difference caused by the half value is extremely large in terms of the index. The emission speeds of the $^4S_{3/2}$ energy level of the Er ion are quite different in Borate glass, silica glass, ZBLAN, and LaF$_3$, which is approximately 4.5*10$^5$ S$^{-1}$ in silica, and is approximately 10$^3$ in ZBLAN, which indicates that the life cycle difference there-between is approximately 450 times.

Furthermore, the absorption spectrum of the Er ion on the light source of 1480 nm in optical fibers of different materials is analyzed as follows. The ZBLAN material has smaller phonon energy, which does not easily affect the life cycle of the Er ion at the high energy level, and thus the optical fiber of ZBLAN is suitable for serving as a host for a frequency up-conversion laser. In the frequency up-conversion, it is considered to further add the pumping light of 1480 nm, through being transited from $^4I_{15/2}$ to $^4I_{13/2}$, the ion quantity at the energy level $^4I_{13/2}$ is improved, so as to prevent the ions at $^4I_{11/2}$ from being relaxed to the energy level $^4I_{13/2}$ due to the life cycle of the energy level as short as 7 μs. The absorption sections of the Er ion doped in several different materials are inspected. The absorption of the ZBLAN in the light source of 1480 nm is higher than that of the silica. Therefore, the optical fiber of ZBLAN is preferred considering the life cycle in the high level and the absorption at the light source of 1480 nm.

Several phenomena may be concluded from the above research. If the light sources in the three wave bands are used separately, they are somewhat limited physically, thereby affecting the conversion efficiency. That is to say, for the light source of 800 nm, the GSA of the Er ion is rather poor. For the light source of 970 nm, the probability of the Er ions at $^4I_{11/2}$ is low, the population thereof is low, and it is difficult to absorb the pumping light source. For the light source of 1460 nm, the Er ion must repeatedly absorb three photons at the same time, so that the efficiency is poor.

Therefore, the practical solution is, for example, using three types of pumping light sources at the same time, so as to increase the up-conversion probability to $^4S_{3/2}$. Considering the main up-conversion path, the light sources of 970 nm and 1480 nm are used to accumulate the population in the $^4I_{13/2}$ meta-stable state, then the photon of 800 nm is absorbed, and then the ions are transited to the $^4H_{11/2}$ excited state and then relaxed and transited to $^4S_{3/2}$, so as to form a green light laser mechanism.

Furthermore, the light source of 970 nm is used, such that the Yb ion is further doped, so as to improve the efficiency for absorbing the light source of 970 nm.

However, based on the multi-light source mechanism, the present invention is not limited to the green light laser. In addition, the ions doped in the optical fiber are considered according to the excited state thereof, so that the types of the doped ions and the number of the ion types are not limited.

Figure 9:
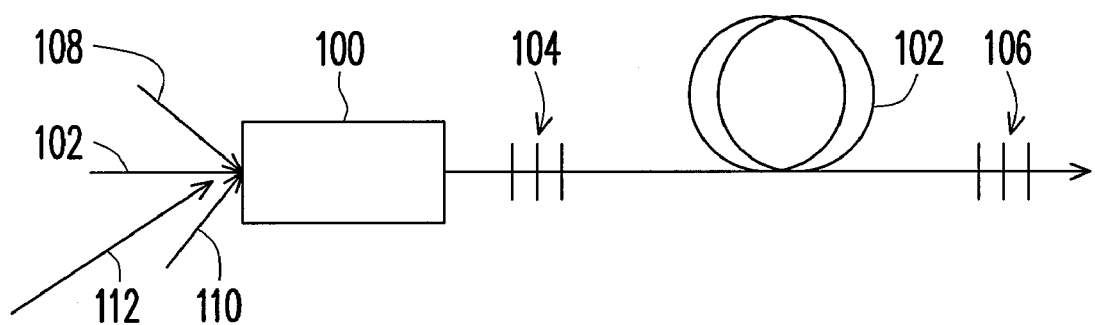
FIGS. 9-11 are schematic views of a laser system according to several embodiments of the present invention.
Figure 10:
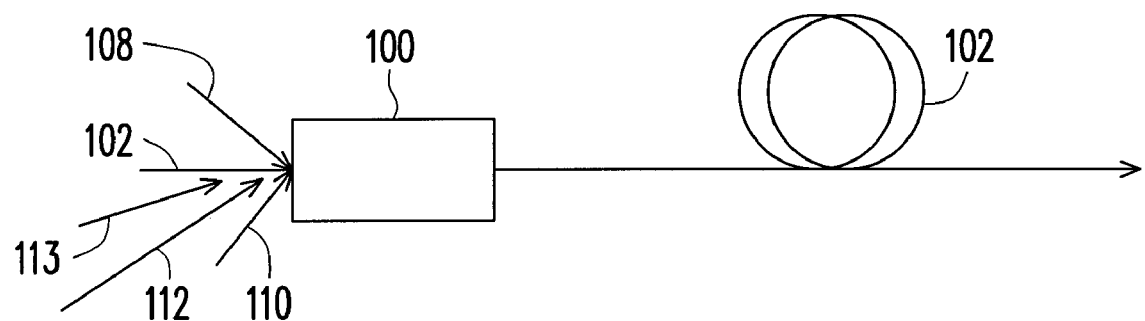
Figure 11:
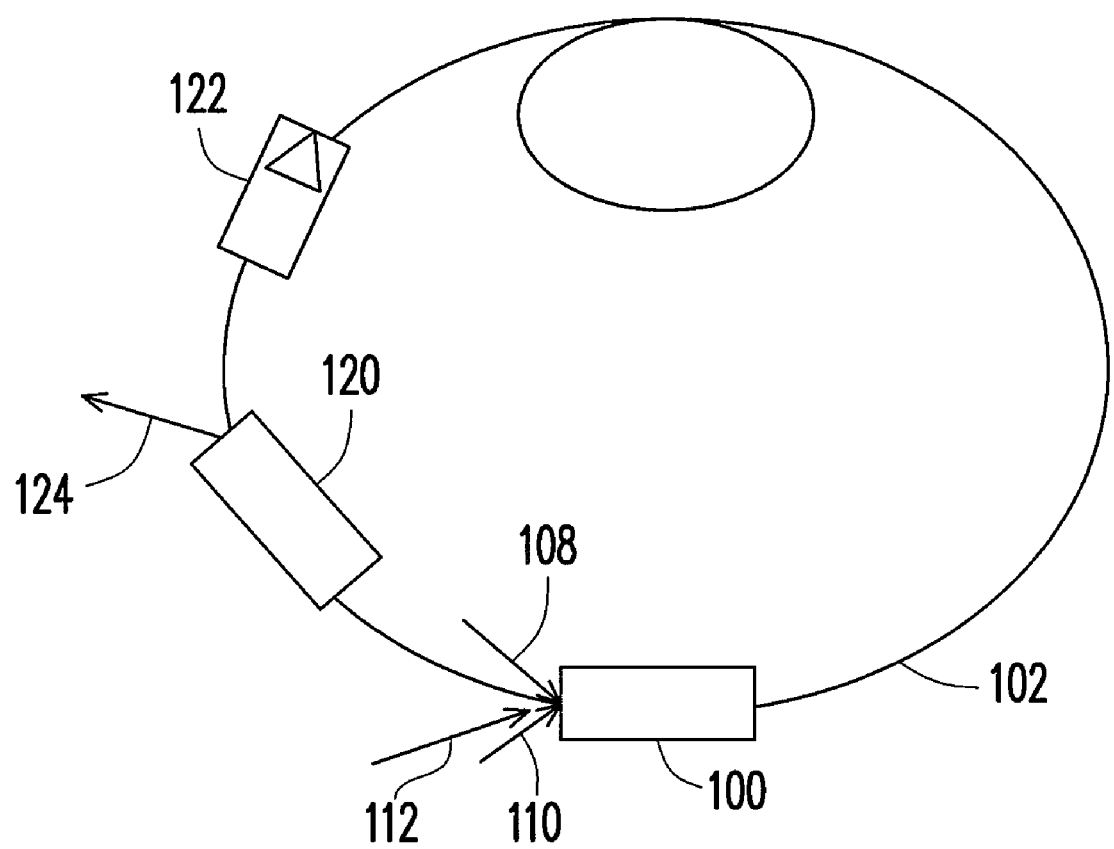

The laser structure is described as follows. FIGS. 9-11 are schematic views of a laser system according to several embodiments of the present invention. Referring to FIG. 9, a combiner 100 is disposed on an input end of an optical fiber 102, such that a plurality of pumping light sources is introduced to the optical fiber 102 through the combiner 100. The pumping light sources include at least two light sources, for example, a pumping light source 108 and a pumping light source 110. For a green light laser, the optical fiber 102 is doped with Er ions or is further doped with Yb ions. The wavelengths of the pumping light source 108 and the pumping light source 110 are, for example, from 790 nm to 825 nm and from 960 nm to 990 nm. According to the practical needs, a pumping light source 112 is further added, and the wavelength thereof is in a range of, for example, from 1450 nm to 1550 nm. Furthermore, a pumping light source from 900 nm to 930 nm, for example, may be added as well. Two optical-fiber gratings 104 and 106, for example, fiber Bragg gratings (FBGs), are disposed on two ends of the optical fiber 102, so as to form a resonance cavity. A central wavelength of the optical-fiber gratings is, for example, a green light of approximately 546 nm.

Referring to FIG. 10, it is similar to FIG. 9, except that the optical fiber 102 is not configured with the optical-fiber gratings to form the linear resonance cavity. The green light laser is introduced to the optical fiber 102 through a seed light source 113 with the wavelength of 540 nm and through the combiner 100. As the green light seed light source 113 is added, it is not necessary to dispose the green light optical-fiber gratings on the optical fiber 102 to form the resonance cavity.

Referring to FIG. 11, the laser system forms an annular resonance cavity by using an annular optical fiber 102. The pumping light sources 108, 110, and 112 are introduced to the optical fiber 102 through the combiner 100. An optical coupler 120 is disposed on the optical fiber 102, so as to output a required laser light 124, which is a green light with a wavelength of, for example, 540 nm. In addition, an isolator 122 directionally for the green light is also disposed on the optical fiber 102.

In a laser system, the above mentioned mechanism is utilized, a plurality of light sources with the low energy is used, and the ionization properties of the doped ions is utilized as well, so as to achieve the laser light with the higher energy level through the excitations for several times, for example, emitting a green light.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A laser apparatus with all optical-fiber, comprising:
a plurality of pumping light sources in different wave bands, wherein the pumping light sources comprise a first pumping light with a wavelength in a range from 790 nm to 825 nm, and a second pumping light with a wavelength in a range from 960 nm to 990 nm, a third pumping light with a wavelength in a range from 1450 nm to 1550 nm, and a fourth pumping light with a wavelength in a range from 900 nm to 930 nm; and
an optical-fiber laser system, comprising an optical fiber at least doped with erbium (Er) element and ytterbium (Yb) element, wherein the optical-fiber laser system outputs a laser light of green through the pumping light sources, wherein the optical-fiber laser system comprises:
a combiner, disposed on the optical fiber to receive the pumping light sources; and
a green-light seed light source, input to the optical fiber also through the combiner, wherein the optical fiber directly forms a linear resonance cavity.

2. The laser apparatus with all optical-fiber according to claim 1, wherein the optical fiber of the optical-fiber laser system is an annular optical fiber, and the optical-fiber laser system comprises an isolator and an optical coupler disposed on the annular optical fiber, and outputs the laser light through the optical coupler.

* * * * *